Dec. 11, 1956 A. J. HORNFECK 2,774,019
ELECTRIC SERVO SYSTEM FOR MEASURING AND CONTROL
Filed Jan. 26, 1953 5 Sheets-Sheet 1

INVENTOR.
ANTHONY J. HORNFECK
BY
Raymond D. Jenkins
ATTORNEY

Dec. 11, 1956  A. J. HORNFECK  2,774,019
ELECTRIC SERVO SYSTEM FOR MEASURING AND CONTROL
Filed Jan. 26, 1953  5 Sheets-Sheet 2

INVENTOR.
ANTHONY J. HORNFECK
BY
Raymond W. Jenkins
ATTORNEY

Dec. 11, 1956  A. J. HORNFECK  2,774,019
ELECTRIC SERVO SYSTEM FOR MEASURING AND CONTROL
Filed Jan. 26, 1953                                    5 Sheets-Sheet 3
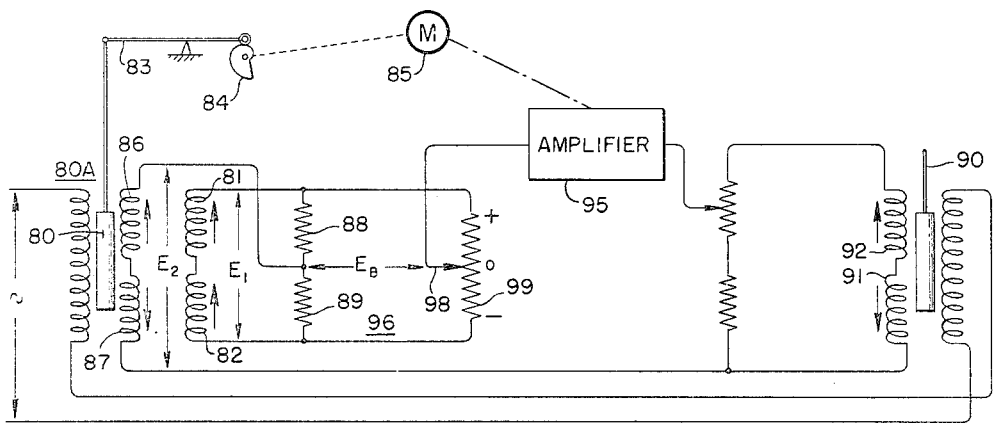
FIG. 4
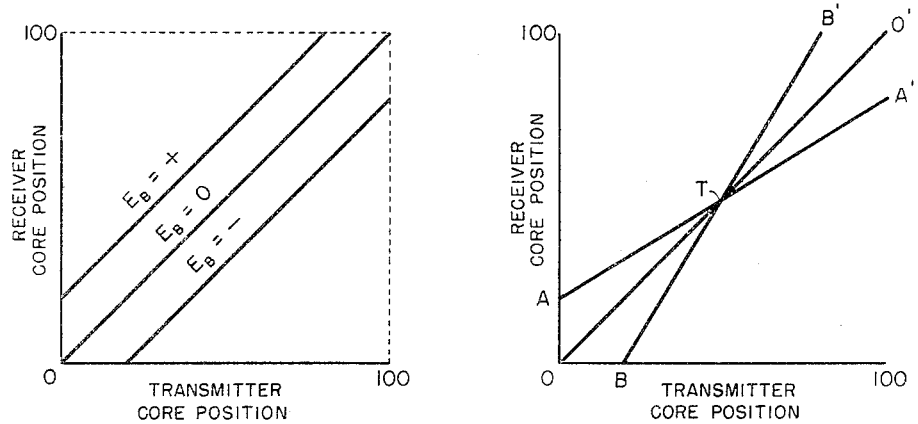
FIG. 5                          FIG. 7
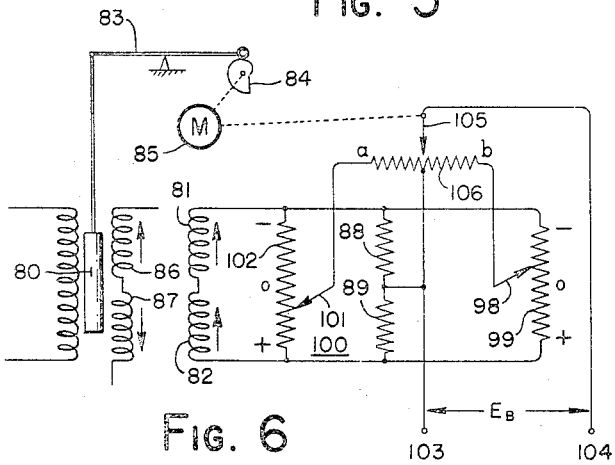
FIG. 6
*INVENTOR.*
ANTHONY J. HORNFECK
BY
Raymond W. Junkins
*ATTORNEY*

Dec. 11, 1956  A. J. HORNFECK  2,774,019
ELECTRIC SERVO SYSTEM FOR MEASURING AND CONTROL
Filed Jan. 26, 1953  5 Sheets-Sheet 4

*INVENTOR.*
ANTHONY J. HORNFECK
*BY*
Raymond D. Jenkins
*ATTORNEY*

Dec. 11, 1956 A. J. HORNFECK 2,774,019
ELECTRIC SERVO SYSTEM FOR MEASURING AND CONTROL
Filed Jan. 26, 1953 5 Sheets-Sheet 5

*INVENTOR.*
ANTHONY J. HORNFECK
BY
Raymond W. Junkins
*ATTORNEY*

United States Patent Office

2,774,019
Patented Dec. 11, 1956

---

2,774,019

ELECTRIC SERVO SYSTEM FOR MEASURING AND CONTROL

Anthony J. Hornfeck, South Euclid, Ohio, assignor to Bailey Meter Company, a corporation of Delaware Application January 26, 1953, Serial No. 333,187

24 Claims. (Cl. 318—28)

This invention relates to an electrical compensating system adapted for use in a balanceable electric network including a transmitter having a movable core transformer sensitive to a variable, and a receiver having a movable core transformer whose core is positioned in accordance with unbalance of the network. More specifically the invention relates to injecting a bias voltage intermediate the receiver and transmitter for biasing the voltage existing at either the receiver or transmitter in relation to the device not so biased.

My invention is particularly adapted for use in systems wherein a variable is adapted to position the core of the transmitter movable core transformer. A movement of the core disturbs the balance of the electrical network, and an amplifier-motor control circuit detects the unbalance and actuates a reversible motor so that it positions the core of the receiver movable core transformer. The movement of the motor may also position an indicator which provides an indication of the value of the variable. Additionally, the movement of the motor may also position a control device, such as a fluid pressure pilot valve, so as to control a system in accordance with the value, or change in value, of the variable.

My invention as applied to the above described balanceable network, provides a bias adjustment for biasing the position of the receiver core in relation to the position of the transmitter core, or vice versa, as the case may be. As a result of this biased core position, a biased indication of the variable can be produced, or a biased control impulse can be established.

One embodiment of my invention employs a bias adjustment in conjunction with a combustion control system, wherein it is desirable to bias the air flow control to provide a larger excess air than would be provided without the bias. In many vapor generating plants, it is desirable to control automatically to maintain a certain air flow-fuel flow or air flow-steam flow relationship for the most efficient combustion. Such combustion guides are explained in Albright Patent 1,972,968. However, in some cases when the vapor generator is operating at a low load, the same air flow-fuel flow relationship which was satisfactory for the higher loads is not the most efficient relationship for the low loads. A simple adjustment of the excess air at low loads is desirable. My invention provides for such an adjustment.

A particular use for my invention is in connection with a marine installation of vapor generators. Here, the excess air requirements for relatively steady cruising speeds are to provide optimum combustion efficiency. When maneuvering, or during soot blowing periods, it is usually desirable to increase the excess air to obviate the possibility of tell-tale smoke. Prior to my invention it was not possible to operate at a different excess air at one rating than at another rating, without manual adjustment each time the rating was charged. Another problem in the measurement and control of marine vapor generators is that the flow measuring devices must usually be of the head type, rather than of the rate of flow type, thus introducing a non-linear relationship which is troublesome to compensate for. The same is true on any vapor generator if one of the flow rate meters (for example steam flow) responds non-linearly, while the comparative flow rate meter (for example air flow) responds linearly, or vice versa.

The invention herein described is also useful in conjunction with the operation of a vapor generator adapted to burn multiple fuels such as coal and natural gas. If two or more dissimilar fuels are burned simultaneously in a furnace and in varying proportions, a problem exists as to the proportioning of the air to the furnace to obtain optimum combustion of the fuels. For example, the air flow requirements for burning coal will be different than the air flow requirements for burning the gas, or for a combination of both coal and gas. Thus, it is necessary to correct the air flow indication and control, for the type of fuel being burned. My invention provides circuitry for such compensation.

Prior art devices have proposed mechanical linkage variations in the receiver apparatus to produce the necessary air flow compensation. My invention represents an improvement over such devices in that the compensation may be made in a simple manner by the manual or automatic adjustment of a bias potential device.

Another object of my invention is to provide various means of injecting a bias potential in conjunction with a balanceable electric network consisting of two movable core transformers so that the bias potential can be successfully added or subtracted regardless of the phase distortion existing in the movable core transformer. Such phase distortion as exists across the secondaries of a movable core transformer is described in Alexander et al. application S. N. 211,414, filed February 16, 1951, now Patent No. 2,708,730, May 17, 1955.

My invention further relates to movable core transformers having a plurality of purposes, and more particularly, to movable core transformers, which simultaneously establish an output potential which varies in phase and magnitude in accordance with a variable, as well as an output potential which remains substantially constant over the range of variable values. The constant potential may be utilized to energize devices to produce a potential of proper phase and magnitude to act as a source of biasing potential. The use of the second set of secondaries in a movable transformer to supply a constant potential is described in my copending application S. N. 269,274, filed January 31, 1952, now Patent No. 2,636,151, April 21, 1953.

A preferred form of my invention includes a movable core transformer responsive to a change in a variable as a transmitting device in a balanceable network having a second movable core transformer as a receiving device for indicating and/or controlling in response to the variable change, with the secondaries wound in aiding relationship from either of the movable core transformers acting to supply a bias potential so that the movement of the receiver core is biased in relation to the transmitter core or vice versa.

These and other features of my invention will be elaborated upon in the following description and claims.

In the drawings:

Fig. 1 diagrammatically represents an embodiment of my invention in conjunction with an oil-fired vapor generator.

Fig. 4 shows a biasing circuit utilizing movable core transformers having dual secondaries.

Fig. 5 is a graph showing relationships which may be obtained from use of the circuit shown in Fig. 4.

Fig. 6 shows a modification of the biasing circuit of Fig. 4.

Fig. 7 is a graph showing relationship which may be obtained from use of the circuit shown in Fig. 6.

Figure 1:
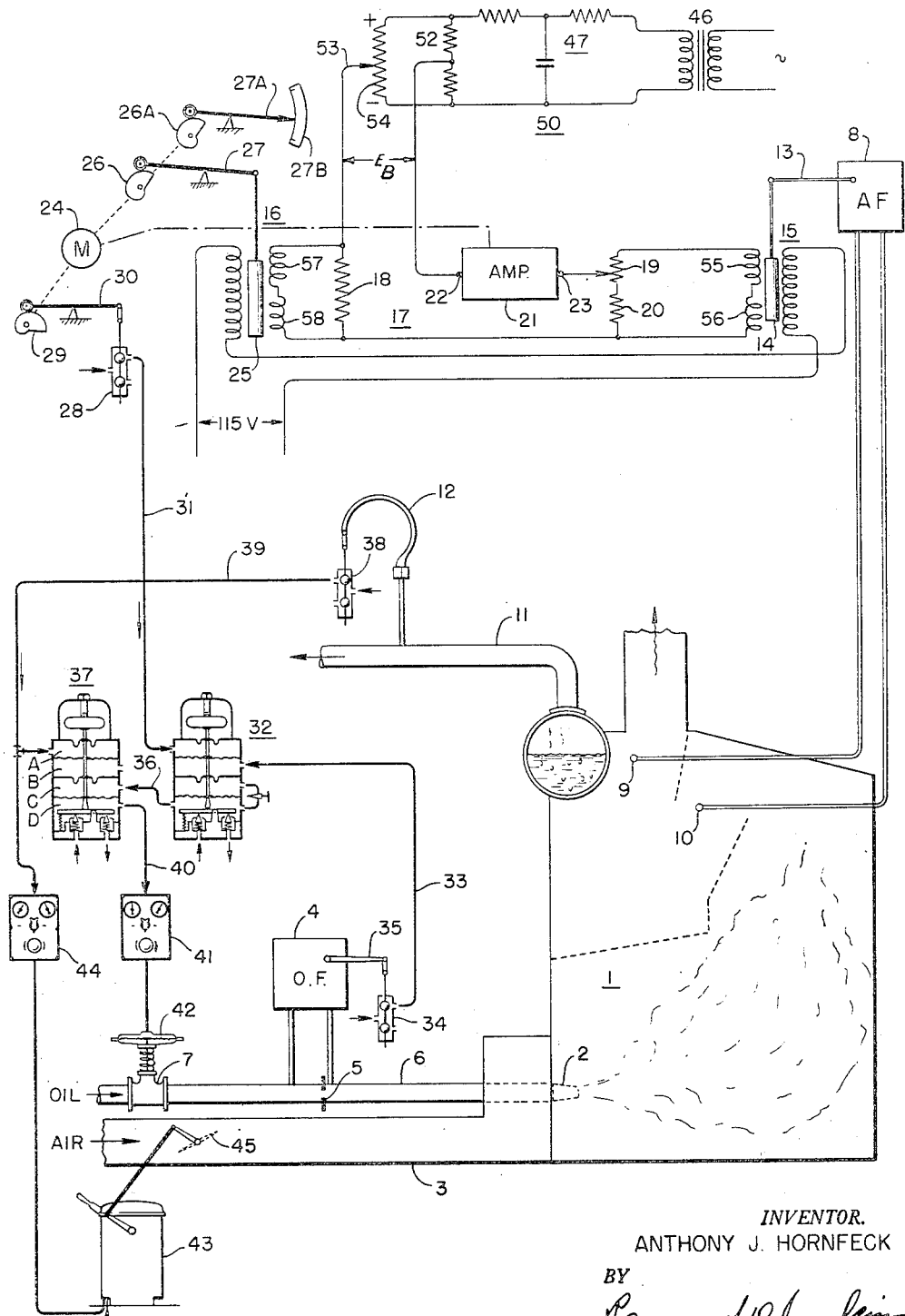

Referring now to the oil-fired vapor generator and control system of Fig. 1, a furnace 1 is shown fired by oil through burner 2. Air for combustion enters through duct 3, ordinarily supplied by a fan (not shown). The amount of oil supplied to the furnace is metered by flow meter 4 and orifice 5 in oil supply line 6, the supply being regulated by fluid pressure actuated control valve 7. The air flow (a combination of excess air and the products of combustion) is measured by air flow meter 8 which is actuated by the differential in the furnace as detected at metering taps 9 and 10. Such air flow measurement is well known in the art and is described in Albright Patent 1,972,968. Steam pressure in outflow line 11 is detected by Bourdon tube 12 which actuates a pilot valve such as is described in Johnson Patent 2,054,464. The problem is to properly maintain the desired air flow-oil flow relation (which may desirably be different at different ratings) at all rates of operation.

The operation of the combustion control system of Fig. 1 is as follows:

The air flow through furnace 1 as measured by meter 8 actuates lever 13 which positions core 14 of movable core transformer 15. Prior to a movement of core 14, the balanceable network 17 (including the movable core transformer 16) is at balance, with the potentials across the resistance 18 and slidewire 19 and resistance 20 being equal. The movement of core 14 by a change in air flow creates an unbalance in potential, and such unbalance is detected by amplifier and motor control circuit 21. Said amplifier and motor control circuit need not be described herein as such circuits are adequately explained in my Patent 2,437,603. The direction and magnitude of the unbalanced potential is detected at terminals 22, 23, and through the amplifier and motor control circuit mentioned, a reversible motor 24 is driven in a direction to position core 25 of movable core transformer 16, through cam 26 and lever 27, so that the potential across resistance 18 again balances the potential across the slidewire 19 and resistance 20.

As motor 24 turns to position core 25, it also positions pilot valve 28 through cam 29 and lever 30. A fluid loading pressure representative of air flow is established by pilot valve 28 in pipe 31. This fluid pressure is communicated to the A chamber of a relay 32 such as is described in Gorrie Re. 21,804. The fluid pressure in the B chamber of relay 32 is representative of the rate of oil flow through oil supply line 6 as metered by oil flow meter 4; by the action of lever 35 positioning pilot valve 34 in accordance with oil flow and establishing the pressure in pipe 33. Thus a comparison of oil flow and air flow is established in relay 32. An increase in air flow results in an increase of loading pressure in the A chamber which disturbs the air flow-oil flow relation so that an increased loading pressure is established in pipe 36 communicating with the C chamber of relay 37. A fluid pressure representative of the steam pressure in pipe 11 already exists in the A chamber of relay 37 having been established by the action of Bourdon tube 12 positioning pilot valve 38.

Since the fluid pressure acting in the C chamber of relay 37 has increased as a result of an increased air flow, the amount of the increased pressure in the C chamber is subtracted from the fluid pressure existing in the A chamber, resulting in a decreased pressure in the D chamber of relay 37. This decreased fluid pressure is communicated by pipe 40 to oil control valve 7 through a selector valve 41. The decreased fluid pressure acting on the diaphragm 42 of valve 7 increases the valve opening so that more oil can enter furnace 1 through burner 2, thus bringing the oil flow and air flow to the desired relationship.

It can be seen that an increase in the steam pressure in pipe 11, will cause an increased loading pressure to be established in pipe 39 by the action of Bourdon tube 12 on pilot valve 38. This increased loading pressure acts in the A chamber of relay 37 to produce an increased fluid pressure in the D chamber of relay 37. At the same time the fluid pressure existing in pipe 39 is active on control drive 43, through selector valve 44, to decrease the opening of damper 45 in air duct 3. The increased loading pressure established in pipe 40, acting through selector valve 41, acts on diaphragm 42 of oil control valve 7 to decrease the flow of oil. Thus the oil flow and air flow have been reduced accordingly, tending to reduce the steam pressure.

Figure 2:
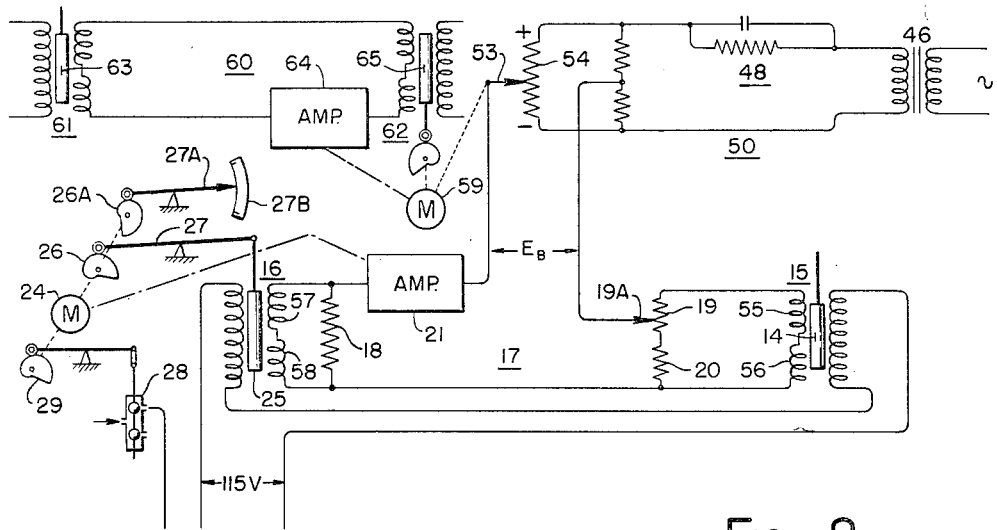
Fig. 2 is a modification of the electric network of Fig. 1.

Now to consider the effect of the biasing network 50 of Fig. 1. As pointed out before, a potential of shifted phase is induced in the secondaries of a movable core transformer. In order that a bias potential may be effectively added or subtracted, the potential of shifted phase existing across the secondaries must be aligned as closely as possible with the phase of the bias potential. As shown in Fig. 1, the biasing network 50 is supplied with a source of alternating current 46 separate from that of the movable core transformer 16. Though the two supply voltages are in phase, the induced potential in secondaries 57 and 58 is not in phase with the potential source at transformer 46. It is, therefore, necessary to provide a phase shifting network 47, so that the phase of the bias voltage $E_B$ will be as nearly consonant with the potential existing at secondaries 57, 58 as possible. Such a phase shifting network 47 is particularly adapted to aligning the voltages when the source of voltage is of 400 cycle frequency. If the supply voltage is 60 cycle then a phase shifting network 48, as shown in Fig. 2 will produce the most satisfactory results.

Tap 53 on resistor 54 may be manually adjustable to provide a positive or a negative bias voltage $E_B$. In essence, this voltage $E_B$ is either added to or subtracted from the potential existing across the resistance 18. The function of bias voltage $E_B$ in the control system of furnace 1 is as follows:

If, for example, it is desirable to increase the ratio of air flow to oil flow, as might be the case when operating the vapor generator at a low rating, the tap 53 is moved upwardly on resistance 54 as viewed in Fig. 1. The position of core 14 has not changed, for the conditions in furnace 1 have not been affected as yet. But, even though core 14 has not changed its position in relation to secondaries 55—56, the movement of bias tap 53 has added a potential between resistor 18 and terminal 22 of amplifier-motor control 21, causing the network 17 to become unbalanced. This state of unbalance causes motor 24 to be actuated by motor control circuit 21 to regain the state of balance by positioning core 25 of receiver transformer 16 so that the potential existing across secondaries 57, 58 (plus the bias potential $E_B$) balances with the potential existing across resistances 19 and 20. This means that receiver core 25 has taken a new position relative to the position of core 14, although there was no actual change of air flow through furnace 1 or change in position of core 14. It was an arbitrary selection of bias voltage $E_B$ to alter the air flow-oil flow relationship to increase the amount of excess air.

As motor 24 was positioning core 25 in accordance with the bias setting of tap 53, it was also positioning pilot valve 28 through the movement of cam 29. This movement of the stem of pilot valve 28 decreased the fluid loading pressure in pipe 31, which established a decreased loading pressure in the A chamber of relay 32. As a result, the pressure in the D chamber of relay 32 is decreased, communicating decreased loading pressure to the C chamber of relay 37 via pipe 36. The decreased loading pressure in the C chamber of relay 37 produces an increased loading pressure in its D chamber, establishes in pipe line 40 an increased loading pressure, which, acting on diaphragm 42 of control valve 7, decreases the valve opening thus restricting the flow of oil through pipe 6. Thus the oil flow has been reduced in respect to the air flow as a result of the bias adjustment of tap 53, resulting in an increased amount of air for the amount of oil being supplied to the furnace 1. If the reduced oil supply rate is insufficient to maintain steam pressure then the pilot 38 will increase air flow and oil flow together, at the new relationship.

In Fig. 2 the bias network 50 is shown with automatic adjustment of tap 53 by motor 59 of balanceable network 60. Network 60 may consist of two movable core transformers 61 and 62, wherein the core 63 may be sensitive to a variable such as gas flow which might be used as a second fuel in a furnace such as furnace 1 of Fig. 1. As the firing of oil and gas simultaneously would require varying amounts of combustion air depending upon the relative amount of gas and oil being fired, it is advantageous to vary the air flow relationship in accordance with the variations in gas flow. Considering that the variable which moves core 63 is gas flow, then a change in gas flow will unbalance network 60, the unbalance will be detected by amplifier-motor control circuit 64, and circuit 64 will then actuate motor 59 to rotate in the proper direction to position core 65 to rebalance the network 60. The motor 59 will also position tap 53 along resistance 64 to establish a new bias potential $E_B$. This new bias potential $E_B$ will unbalance network 17, and motor 24 in operating to rebalance network 17 through repositioning of core 25, will establish a different loading pressure output in pilot valve 28 which will actuate the control system as described in Fig. 1 to establish a new air flow-fuel flow ratio in accordance with the new gas flow which originally altered the position of core 63.

Thus, the circuit of Fig. 2 provides for a continuing bias adjustment to properly adjust the control system of furnace 1 in accordance with a variable acting on core 63 of movable core transformer 61 of network 60.

Figure 3:
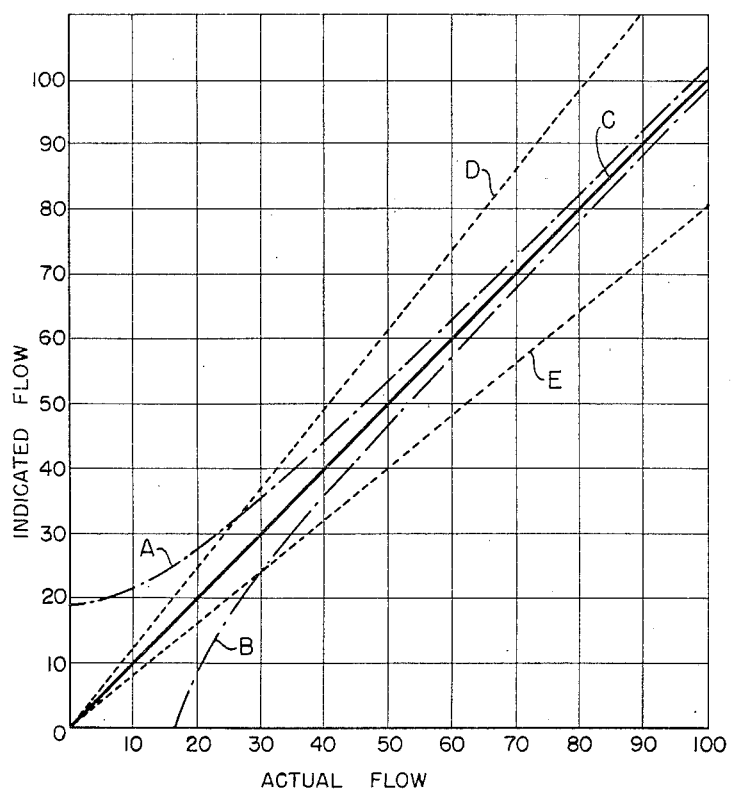
Fig. 3 is a graph showing relationships which may be obtained through use of my invention.

In Fig. 3 a group of curves are shown with indicated flow as the ordinate and actual flow as the abscissa. The actual flow, being in this case air flow as described in conjunction with Fig. 1 is determined by the air flow across metering taps 9 and 10 of furnace 1 and the resultant action of air flow meter 8 upon core 14 of movable core transformer 15.

As is well known, the flow is represented by a constant times the square root of the head. The position of core 14 is proportional to the head caused by the flow of air past taps 9 and 10. When the head of meter 8 changes, arm 13 moves core 14 to a new position proportional to the head. Thus, network 17 is unbalanced, and the unbalance signal actuates motor 24 through amplifier and motor control circuit 21 to position core 25 until the network 17 is again in balance. To get an indication that reads in flow rather than in head it is necessary to use a square root cam 26. Thus the rotation of the shaft of motor 24 turns square root cams 26, 26A, and 29 to position core 25, indicator 27A, and pilot valve 28 respectively.

Regardless of the type of cam used, the electrical relationships of circuit 17 are not altered, but only the amount of motor rotation required to position the core 25 is changed by the cam chosen. Thus with a square root cam 26 rotated by motor 24 a plot C of Fig. 3 may be obtained, for in such instance the rotation of the motor 24 is proportional to flow, and the flow is indicated at indicator 27A on scale 27B. Plot C as can be seen is linear throughout the range from 0–100% flow.

Now when the bias voltage $E_B$ is injected in the network 17 by the adjustment of tap 53, the electrical relationships of the network 17 are changed as described in Fig. 1. Flow is now made proportional to a constant times the square root of the head plus the bias voltage. Thus as can be seen in plot A, with tap 53 moved in a direction for negative bias as viewed in Figs. 1 and 2, there is a greater effect as a result of the bias voltage $E_B$ at the lower percentage of flow. For example, an actual flow as detected by meter 8 of 20%, will be indicated as 27.5% on scale 27B. At the same time pilot valve 28, will produce an output loading pressure representative of 27.5% flow although the actual flow is 20%. Plot B, of course, can be produced by selecting a positive bias by moving bias tap 53 in a positive direction as viewed in Figs. 1 and 2.

Thus structure is provided for biasing the effect of the air flow as metered in furnace 1. By such biasing, the control system of furnace 1 can be made to respond to a biased air flow which will have the effect of either increasing or decreasing the excess air as described in Fig. 1. Plots D and E are representative of the effect on the air flow indication and control of range adjustment tap 19A with no bias voltage active in network 17. Tap 19A allows for a change of the total potential available across resistances 19 and 20, and, as plots D and E indicate, the effect of a range change is most effective at the higher percent of flow. For example, at 100% actual flow there would be an indication and a control pressure representative of 80% flow established as seen in plot E. Thus the excess air may be varied by range 19A when the furnace is operating at or near capacity.

The bias adjustment is particularly novel in that a change made while the flow is in the lower range is hardly effective at the higher range of flow, thus allowing the operator to make a change at say 10% and, leaving this bias adjustment in the network, there will be little effect on the overall operation when the unit is operated at the higher loads. Such bias adjustments in prior art have affected the entire range equally, and it has been necessary previously to remove the bias before proceeding to the higher loads.

The above discussion is related to the production of a bias voltage whose phase has been satisfactorily shifted so that it could be satisfactorily injected into the balanceable network with either an additive or subtractive effect. In such discussion, it was pointed out that the source of the bias voltage was separate from that voltage supplying the movable core transformers. It will now be shown, in conjunction with Fig. 4, that a single supply of voltage can be satisfactory if a movable core transformer with two sets of secondaries is utilized. One of the sets of secondaries is wound in what is termed a bucking relationship, and the second set of secondaries on the same transformer is wound in aiding relationship. Reference to the arrows in Fig. 4 will show the relationship of the windings of the two sets of secondaries.

Movable core transformer 80A of Fig. 4 simultaneously establishes an output potential across secondaries 86 and 87 which varies in magnitude in accordance with the movement of core 80 and at the same time an output potential across secondaries 81 and 82 which remains substantially constant over the range of core movement.

The core member 80 is so arranged as to effect a constant induced potential $E_1$ in secondary windings 81, 82 for any position that core 80 may assume as a result of the action of motor 85 and cam 84 as will be described below. The member 80 in a central position relative to secondary windings 86, 87, results in induced potentials in these windings that total to zero. A movement of the core member from its central position results in an increase in the potential induced in one of the windings 86, 87, and a decrease in the potential induced in the other windings. The resultant potential across these windings will then be equal to some value $E_2$ which is dependent upon the distance at which the core member is spaced from its neutral position.

To bias the position of the core of one of the movable core transmitters in relation to the core of the other movable core transformer, it is necessary to inject a bias potential $E_B$ into a balanceable network consisting of the secondaries of two movable core transformers and the amplifier-motor control circuit 95. However, the problem of adding a bias potential $E_B$ to a phase-shifted potential induced across secondaries 86, 87 is solved quite easily by my invention, for, in Fig. 4, the bias potential is supplied by the second set of secondaries 81, 82 of movable core transformer 90, and, as such, the constant voltage induced in secondaries 81, 82 will be of the same phase as the voltage induced in the secondaries 86, 87. Thus the bias voltage $E_B$ may be added or subtracted to induced potential $E_2$ without the need of a phase shifting network.

Upon a variation of the position of core 90, as might be caused by a change in air flow as described in conjunction with Fig. 1, the network is unbalanced. Such unbalance is detected by amplifier and motor control circuit 95, which actuates motor 85. Since motor 85 turns in accordance with the direction and magnitude of the unbalance, core 80 is positioned by motor 85 through cam 84 to rebalance the network.

If it is desired to bias the position of receiver core 80 in relation to the transmitter core 90, then manually adjusted tap 98 may be positioned on slide wire 99 in either a positive or negative direction as indicated in Fig. 4.

The effect of fixed positive biasing is shown in the graph of Fig. 5 where it can be seen, for example, that a 10% transmitter core position results in a 30% receiver core position. The graph shown in Fig. 5 is produced when using a linear cam 84; however, if a square root cam is used a curve such as curve A of Fig. 3 would be produced and for a use as described in conjunction with Fig. 1.

Fig. 6 shows a section of the balanceable network shown in Fig. 4. Here another type of bias potential network 100 is shown in detail, and provides for what is known as a dual zero (at O and T) and 100% offset, as shown in the graph of Fig. 7. Again the bias network is shown supplied by a potential existing across aiding secondaries 81, 82 which establishes a constant voltage of the same phase as that of the potential across secondaries 86, 87. The bias potential $E_B$ is produced across terminals 103, 104 by bias circuit 100. Manual adjustment taps 98 and 101 are set on slidewire 99 and 102 respectively. As shown, tap 98 is set in a negative direction and tap 101 is set in a positive direction. Tap 105 is positioned on slidewire 106 by the movement of motor 85, motor 85 being actuated in accordance with network unbalance as discussed in conjunction with Fig. 4.

If taps 98 and 101 are each placed in a zero position as indicated on Fig. 6 then linear plot OTO′ is obtained, indicating that each position of the transmitter core is equaled by the position of the receiver core.

With tap 101 positioned in a positive direction as viewed in Fig. 6, a positive biasing of the receiver core position in respect to the transmitter core position is accomplished. If tap 101 is placed in a negative position, a negative biasing action results. In other words the position of tap 101 determines the biasing of the core position as shown by plots A—T and B—T of Fig. 7, and, likewise the position of tap 98 determines the biasing position of the core position as shown by plots T—B′ and T—A′. Thus it is possible to produce plot A—T—A′ of Fig. 7 by positioning tap 101 in a positive position and positioning tap 98 in an equal negative position, with the balancing motor 85 driving tap 105 from $a$ to $b$ on resistance 106. With tap 105 in the position shown in Fig. 6, the value of $E_B$ is zero thus point T of the plots shown in Fig. 7 is produced each time tap 105 is moved past the mid-point of resistance 106.

If resistance taps 101 and 98 are each placed in a positive position, and the rebalancing motor 85 drives tap 105 from $a$ to $b$ in rebalancing the network for various transmitter core positions, plot ATB′ of Fig. 7 is produced. Or it would be possible to position, for example, tap 101 in a positive direction, and position tap 98 at a zero position and thus produce plot ATO′ of Fig. 7. Other plots determined by positions of taps 101, 98, are obvious from the above description of the operation.

The plots of transmitter core position versus receiver core position shown in Fig. 7, result from the use of a linear cam 84. A square root cam, or a slidewire 106 which may be tapered, could have been used if it had been desired to plot, for example, actual flow of a variable versus indicated flow of a variable.

Figure 8:
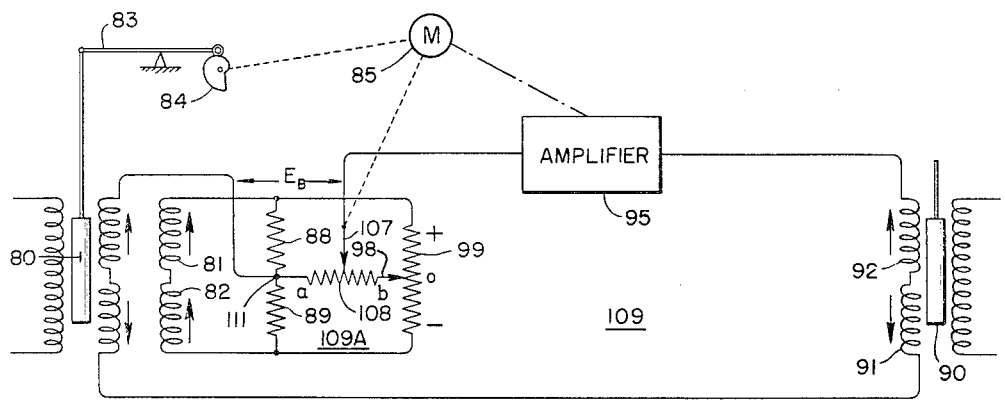
Fig. 8 shows a further modification of the biasing circuit.

A different bias network 109A is shown in Fig. 8, wherein the bias voltage appears across terminal 111 and the juncture of resistance tap 107 on resistance 108. Core 90 is adapted to be positioned in accordance with a change in a variable (not shown), and, as core 90 is moved the balanceable network 109 is unbalanced. The direction and magnitude of the network unbalance is sensed by amplifier and motor control circuit 95, which actuates motor 85 to position core 80 and tap 107 to rebalance network 109.

Bias network 109A consists of bridge network including equal resistances 88 and 89 and resistance 99 with an adjustable tap 98. An adjustable resistance 108 is connected between terminal 111 of the bridge and at tap 98. The bridge is supplied by a potential produced across aiding secondary windings 81 and 82 of the receiver movable core transformer.

To inject a bias voltage $E_B$ into network 109, it is necessary to adjust tap 98 in a positive or negative direction as shown in Fig. 8. If tap 98 is placed in a positive position, the network 109 is unbalanced by the amount of voltage $E_B$ produced. The motor 85 being actuated by the unbalance signal as described above will reposition core 80 and move tap 107 on resistance 108 from $a$ toward $b$. Thus, plotting the transmitter core position versus receiver core position, a plot such as solid A—O′ of Fig. 9 will be produced. If, on the other hand, tap 98 is placed in a negative position, plot B—O′ will be produced.

Figure 9:
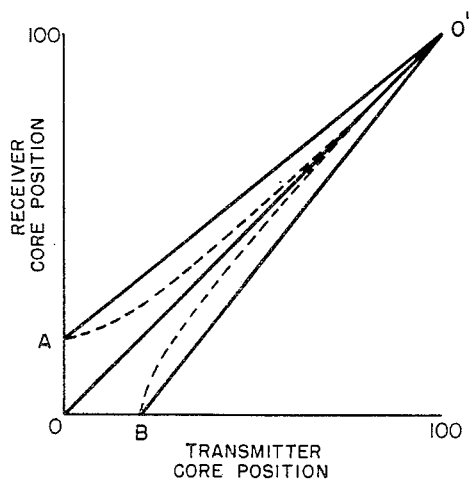
Fig. 9 is a graph of the relationships which may be obtained from the use of the circuit of Fig. 8.
Figure 10:
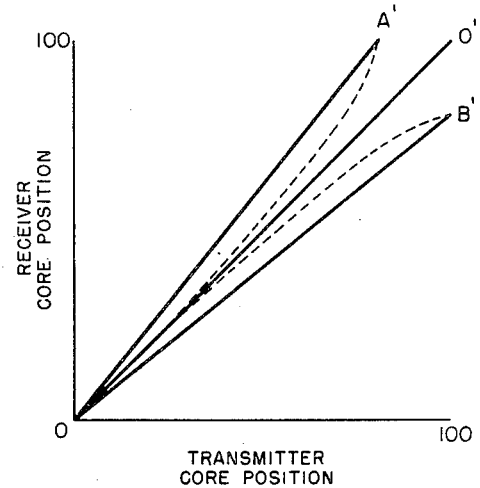
Fig. 10 is a graph of other relationships which may be obtained from use of the circuit of Fig. 8.

By changing the polarity of the bridge so that motor 85 drives tap 107 from $b$ toward $a$ along resistance 108 to rebalance network 109, plots such as O—A′ and O—B′ of Fig. 10 can be produced in the same manner as described in conjunction with the plots of Fig. 9.

The plots shown in Figs. 9 and 10 have been produced by using a linear cam 84. If a square root cam is used in place of linear cam 84, it is possible to obtain the dotted curves shown in Figs. 9 and 10 which are similar to curves A and B of Fig. 3, with the exception that in Figs. 9 and 10 the curves show full bias at one end of the range and no bias at the other end of the range, as contrasted with A, B of Fig. 3 where it can be seen that some bias exists throughout the entire range.

Figure 11:
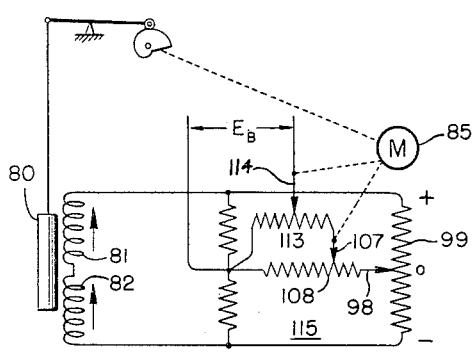
Fig. 11 shows a further modification of the biasing circuit.
Figure 12:
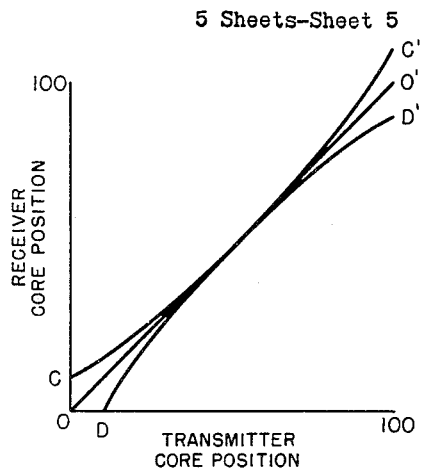
Fig. 12 is a graph of the relationships which can be obtained from the use of the biasing circuit shown in Fig. 11.

Fig. 11 shows a bias potential circuit 115, which produces a bias potential $E_B$ to be utilized in a balanceable network as described in conjunction with Figs. 1, 4, 8. Bias circuit 115 produces a bias in accordance with the square law as shown on graphs C—C' and D—D' of Fig. 12. Again motor 85 is actuated by the unbalance signal, and as it positions a movable core, as described in the above figure, it also positions taps 114, 107 on slidewire 113 and 108 respectively. When tap 98 is positioned in a positive direction on slidewire 99, then the action of motor 85 produces curve C—C' of Fig. 12, and with tap 98 in the negative direction, curve D—D' is produced. Such a bias circuit as 115 provides for biasing at either end of the transmitter range with relatively little biasing in the central portion of the range.

Figure 14:
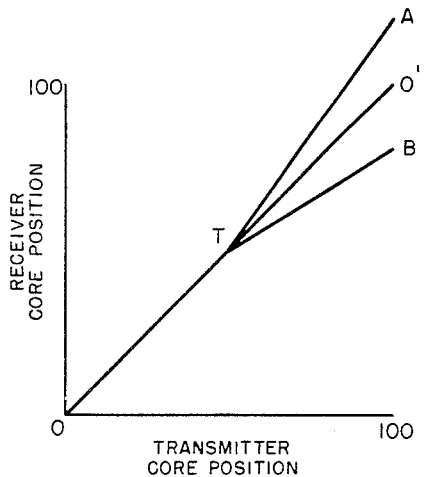
Fig. 14 is a graph of the relationships which may be obtained from the use of the biasing circuit of Fig. 13.
Figure 15:
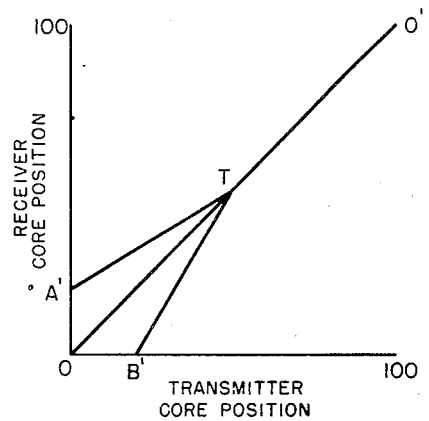
Fig. 15 is a graph of other relationships which may be obtained from the use of circuit shown in Fig. 13.
Figure 13:
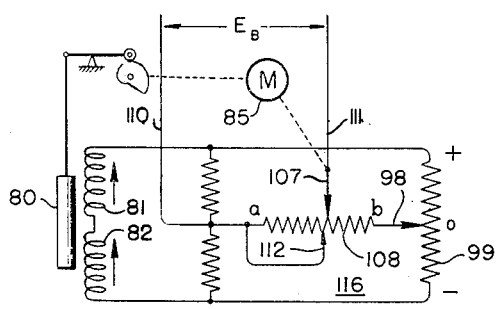
Fig. 13 shows a further modification of the biasing circuit.

Fig. 13 shows a bias potential circuit 116 producing a bias voltage $E_B$ across leads 111 and 110. Tap 98 can be set in a positive direction on slidewire 99, and motor 85 actuated by an unbalance in the movable core transformer network also positions tap 107 along slidewire 108. An adjustable tap 112 has been added to add flexibility to the type of biasing which can be produced by circuit 116. If tap 112 is placed in the center of slidewire 108 and tap 107 is moved from $a$ to $b$ then curve OTA is produced as shown in Fig. 14. If the tap 107 is moved from $b$ to $a$ then curve A'TO' of Fig. 15 is produced. If tap 98 is placed in a negative direction on slidewire 99 then curves OTB and B'TO' of Figs. 14, 15 respectively are produced.

While I have shown particular embodiments of my invention, it will be understood that I do not wish to be limited thereto since modifications may be made, and I, therefore, contemplate by the appended claims to cover any such modifications as fall within the true spirit and scope of my invention.

What I claim as new and desire to secure by Letters Patent of the United States is:

1. In a telemetric control system comprising, in combination; a first and a second pair of relatively fixed windings, a primary winding magnetically coupled to a secondary winding, circuit means connecting the respective primary and secondary windings in series, a movable core member for each pair of windings, said core members being longitudinally shiftable along the axes of both windings of the respective pairs, a source of alternating current for energizing the primary windings of each of said pairs of windings, means responsive to a variable for shifting the core member of said first pair of windings longitudinally of the axes thereof for varying the magnetic coupling between the primary and secondary windings thereof, and receiver means selectively responsive directionally in accordance with the phase of the effective voltage in the circuit connecting the secondary windings to shift the core member of the second pair of windings to alter the magnetic coupling therebetween to thereby bring the voltage induced in the second winding of said last named pair of windings into equality with the voltage induced in the secondary winding of the first pair of windings; the improvement including apparatus providing a bias potential connected in series with the secondary windings and the receiver means, said apparatus being constructed to phase the bias potential to match the distorted phase of the output of one of the secondary windings, separate means to adjust the magnitude of the bias potential so that the adjusted potential may be added to or subtracted from the potential across the two pairs of secondary windings.

2. The improved telemetric control system of claim 1 including a potentiometer shunting the secondary windings of one of the pairs of windings whereby the voltage induced in the shunted secondary windings will be proportioned in its comparison to the other voltages of the secondary windings circuit in accordance with the setting of the potentiometer.

3. The improved telemetric control system of claim 2 included in combination with a device continuously responsive to a variable other than that provided for shifting the core of said first pair of windings for continuously adjusting the magnitude of the source of bias potential in series with the secondary windings and receiver means.

4. A control system for a variable of a condition including in combination, a balanceable network comprising two like movable core transformers energized from a common source and having series connected outputs, means for positioning the core of one of the movable core transformers in accordance with an agent supplied the condition to thus provide a voltage unbalance, amplifying and motor control means responsive to the voltage unbalance between the two movable core transformer outputs, a motor controlled by the motor control means for positioning the other of the transformer cores toward balance with the first movable core, control means under the direction of the motor for the variable supplied the condition, a means arranged in series with the movable core transformers and amplifying and motor conrol means which is energized in phase with the common source for adding further unbalance voltage to the balanceable network, means for distorting the phase of the further unbalance voltage supplied to match that of the initial unbalance voltage resulting from core movement, and means for controlling the magnitude of the unbalance further voltage supplied.

5. The system of claim 4 in which the structure for supplying the unbalance voltage to the network is specifically a Wheatstone bridge which is energized from the common source.

6. The system of claim 5 in which the means for distorting the phase of the unbalance voltage is an electrical network between the common voltage supply and the Wheatstone bridge.

7. The system of claim 5 in which the output of one of the movable core transformers is supplied to the balanceable network through a shunting potentiometer.

8. The system of claim 7 in which the Wheatstone bridge output is arranged through a potentiometer forming two adjacent arms of the bridge whereby the phase of the output voltage used therefrom may be changed 180° with respect to the unbalance output voltage of the movable core transformer positioned by the amplifying and motor control means to effect positive or negative bias.

9. A combustion control system including, a means by which a first fuel is supplied the combustion process, a means by which combustion air is supplied the combustion process, a means whereby the combustion air is measured and a first voltage established proportional therewith, a means is provided under the direction of a motor for establishment of a second voltage to oppose the first voltage and simultaneously control the first fuel supply to the combustion process, a means is provided in series with that structure establishing the opposed first and second voltages for introducing a source of adjustable potential to be compared to the first and second voltages, a device for adjusting the phase of the adjustable potential introduced in series, and means responsive to a second fuel supply means for adjusting the magnitude of the potential introduced in series with the first and second voltages.

10. A combustion control system including, means responsive to a demand upon the combustion process and exerting control from the combustion air and a first fuel supplied to the combustion process, a first balanceable electric network responsive to the combustion air supplied and controlling the first fuel to the combustion process conjointly with the means responsive to the demand, an electric network for introducing a potential of predetermined distortion in its phase into the first balanceable electric network, and a second balanceable electric network responsive to a second fuel for the combustion process and controlling the potential of distorted phase introduced into the first balanceable electric network.

11. A balanceable network including one set of secondaries for each of two movable core transformers having primaries, a second set of secondaries for one of said transformers, a common source of electrical potential for the primaries of said transformers, said second set of secondaries supplying a constant voltage output, means for selecting a portion of said constant voltage output, means for injecting said selected voltage output into said balanceable network to unbalance it, and motor means including amplifier and motor control means for rebalancing the network, whereby the balance position of the core of one of the movable core transformers is biased in relation to the position of the core of the other movable core transformer in accordance with the amount of said selected voltage.

12. In a biasable balanceable network consisting of two movable core transformers one with double sets of secondaries and the other with one set, an amplifier and motor control circuit for detecting and responding to the unbalance between one set of secondaries on the two transformers, a motor controlled by the motor control circuit for positioning the movable core of one transformer in accordance with the unbalance caused by the positioning of the movable core of the other transformer by a variable, the improvement including, a bridge network energized by the potential induced in one of the other set of secondaries, an adjustable tap in said bridge for establishing the magnitude and direction of a bias voltage, means connecting the output of said bridge in series with one movable core transformer output and the amplifier and motor control circuit, and an adjustable potential device in the output of said bridge for establishing the effective magnitude of the bias voltage, the adjustable potential device in the output of said bridge being connected to be positioned by said motor to vary the biasing voltage from a minimum to a maximum, whereby the network is rebalanced at the adjusted bias magnitude.

13. A balanceable network substantially as described wherein the two movable core transformers each have a pair of bucking secondaries, and one has a pair of aiding secondaries, a single supply of electrical energy, a biasing network energized by said additive secondary windings for injecting a bias voltage into said balanceable network including both pairs of bucking secondaries, said biasing network including an adjustable bridge network, a potential shunting device with an adjustable tap across the said bridge, a potential device connecting the adjustable tap forming one terminal of the biasing network output, and a fixed tap between the two non-adjustable legs of the bridge forming the other output terminal of the biasing network, and connected to the center tap of the said potential device connecting the said adjustable bridge and said adjustable shunting device, said adjustable tap forming one terminal of the biasing network output positionable by the rebalancing motor of the balanceable network, whereby the bias potential injected into said balanceable network varies from a maximum to a minimum bias.

14. A balanceable network substantially as described wherein the two movable core transformers each have a first pair of secondary windings wound in bucking relation, and at least one has a second pair of secondary windings wound in additive relation, a single supply of electrical energy, a biasing network energized by secondary windings wound additively, said biasing network including a bridge network with a tap adjustable along one side of the bridge, a resistor in said tap and subjected to a plurality of taps, one positionable manually, and one positioned by the balancing motor, whereby movement of the motor injects a biased voltage into the balanceable network of the value determined by the position of all the adjustable taps.

15. A balanceable network substantially as described wherein the two movable core transformers each have a pair of secondary windings wound in bucking relation, and one has a pair of secondary windings wound in additive relation, a supply of electrical energy for said transformers, a balancing motor for the network, a biasing network energized by said secondary windings wound additively, said biasing network including a resistor having a tap to relatively adjust two bridge legs and a bridge network including two potential devices in parallel connected between two fixed legs of the bridge and the bridge adjustment tap, and two taps positionable simultaneously on said parallel potential devices by the action of said balancing motor, whereby the bias voltage injected into the balanceable network produces a bias in accordance with the square law.

16. The network as defined in claim 11 wherein the second set of secondaries has its output dephased from that of the source, substantially the same as the output of the first set of secondaries for the same transformer.

17. In a potential balance network, in combination, a first potential producing device having an output adjustable in accordance with the value of a variable and a second potential producing device having an output adjustable to restore balance after a change in the output of the first device; a source of bias voltage, means for manually adjusting the bias voltage in sense and magnitude, means for injecting said bias voltage into said network, means including an amplifier and motor control means for detecting potential unbalance in said network equal to the unbalance potential caused by change of the variable and the amount and sense of the injected bias potential, means responsive to the amplifier and motor control means for adjusting said second potential producing device for restoring balance to the potential network, whereby the restoring potential is equal to that produced by a change in the variable combined with the selected bias potential and control means for said variable actuated in unison with the adjustment of the second potential producing device.

18. The potential balance network of claim 17 wherein the source of bias voltage energizes a bridge whose output is derived from a neutral point between two arms thereof and a contact manually adjustable to fix the ratio of the remaining arms.

19. The apparatus of claim 18 in which a potentiometer extends between said point and contact, a slider on said potentiometer providing with said point the usable bias, and means to move said slider from the means providing the adjustment of the second potential producing means.

20. The apparatus of claim 19 in which a second slider on said potentiometer is directly connected to said point and manually adjustable to change the effective range of the first slider.

21. The apparatus of claim 18 in which a potentiometer extends between said point and contact, a second potentiometer extending between said point and a slider on the first potentiometer, and a slider on said second potentiometer forming with said point the output, and means to actuate said sliders simultaneously and from the means providing the adjustment of the second potential producing device.

22. The potential balance network of claim 17 wherein the source of bias voltage energizes three parallel resistors one having a center tap and the others adjustable sliders, a potentiometer connected between said sliders and having its midpoint and one bias output terminal connected to said center tap, a slider on said potentiometer forming the other bias output terminal and means to actuate said last mentioned slider from the means providing the adjustment of the second potential providing device.

23. A balanceable network including; a first and second movable core transformer having primary windings energized from a source of alternating potential, a first secondary winding structure of each of said transformers comprising a pair of bucking secondary windings, a second secondary winding structure for one of said transformers, a core member in each of said transformers for varying the potentials induced in the bucking secondary windings while producing substantially no variation in the total potential in the second secondary winding structure, and means introducing the outputs of said first secondary windings into the balanceable network; a bias network energized by the potential of the second secondary winding structure, and means to introduce a selected portion of the output of said bias network into the said balanceable network; means for varying the output of one of said first secondary windings by a variable; and means responsive to the unbalance of potentials in the balanceable network and adapted to vary the output of the other of said first secondary winding structures to balance the network.

24. The combination of claim 23 whereby the bias network output potential is adjusted in accordance with a second variable.

References Cited in the file of this patent

UNITED STATES PATENTS

| | | |
|---|---|---|
| 2,363,690 | Razek | Nov. 28, 1944 |
| 2,420,539 | Hornfeck | May 13, 1947 |
| 2,519,562 | Glass et al. | Aug. 22, 1950 |
| 2,594,604 | Ziebolz et al. | Apr. 29, 1952 |
| 2,611,812 | Hornfeck | Sept. 23, 1952 |
| 2,615,936 | Glass | Oct. 28, 1952 |
| 2,692,969 | Baring | Oct. 26, 1954 |